United States Patent [19]
Ziarkowski et al.

[11] Patent Number: 4,473,664
[45] Date of Patent: Sep. 25, 1984

[54] COLORED INERT MATERIAL FOR SEPARATION OF ANION AND CATION RESIN COMPONENTS

[75] Inventors: Stanley M. Ziarkowski, Mount Laurel; James M. Burke, Medford Lakes, both of N.J.

[73] Assignee: Sybron Corporation, Rochester, N.Y.

[21] Appl. No.: 515,709

[22] Filed: Jul. 20, 1983

[51] Int. Cl.³ .............................................. B01J 1/09
[52] U.S. Cl. ..................................................... 521/28
[58] Field of Search ........................................ 521/28

[56] References Cited

U.S. PATENT DOCUMENTS 3,957,741  5/1976  Rembaum et al. .................. 526/320
4,151,332  4/1979  Chong et al. .......................... 521/28

Primary Examiner—Joseph L. Schofer
Assistant Examiner—Peter F. Kulkosky
Attorney, Agent, or Firm—Robert A. Gerlach; Owen D. Marjama

[57] ABSTRACT

An inert bead form polymer, of intermediate settling velocity between cation and anion exchange resins, which is dyed a highly visible color.

4 Claims, No Drawings

COLORED INERT MATERIAL FOR SEPARATION OF ANION AND CATION RESIN COMPONENTS

BACKGROUND OF THE INVENTION

It was suggested in mid 1952 that an inert polymeric material of the proper specific gravity and particle size act as a separator for the anion and cation resin components in mixed bed ion exchange systems. The purpose of the inert layer, which has no ion exchange properties, is to act as a physical buffer and minimize cross-contamination between the anion and cation components. Suitable polymeric materials to accomplish this effect were not available until recent years when inert polymers based on crosslinked acrylic polymers were produced. These polymers typically have a carefully selected size distribution which give them a settling velocity intermediate the typical heavier cations exchange resin and typically lighter anion exchange resin. Thus in a backwash operation, for example, to separate the cation and anion layers, the inert zone will form a physical barrier between the cation and anion exchange resins. These materials were quite effective in separating the components and are available commercially at this time. These materials served their chief purpose by physically minimizing cross contaminaion of cation and anion layers. Unfortunately, the materials available as inert separators were white to light tan to brownish in color and were only slightly different in color from many typical ion exchange resins. In other words, they could not offer the operator any significant visual distinction between the anion and cation resin components. In addition, after any extended use, iron rust and other sludges begin to coat the surface of the ion exchange resin and the inert material and render any distinction between the layers practically impossible.

SUMMARY OF THE INVENTION

The difficulty of visually distinguishing the inert zone from either the anion and cation resin components of mixed bed ion exchange systems was recognized and a solution was found by dyeing the inert material with a dye which gave a substantially permanent, bright color. This was accomplished by the introduction of a polymer soluble dye which gave a bright uniform color to the inert. Once the need was established, a blue color was selected as the most distinctive and preferred for most cation and anion exchange components, although other suitable distinctive colors such as green, red, black, dark brown and yellow can also be used. The use of this dyed inert layer has application wherever mixed bed ion exchange systems are used. Typical applications include fluid processing such as water purification, condensate polishing, deionization, etc.

DETAILED DESCRIPTION OF THE INVENTION

In carrying out the present invention, it was recognized that the color of the inert material must be permanent, not destroyed by oxidative attack, or dissolved by water. Contacting the inert with concentrated sodium hypochlorite for extensive periods of time resulted in no tendency to bleach the dye. It was also important that the dyed inert material should not impart extractables to the water being treated. To determine this, the standard FDA tests were performed and no evidence of dye extraction was found when the inert was contacted with water for extended periods of time.

Another important property of the inert was a careful balance of a surface hydrophilicity without the substantial ion exchange capacity which would retain sodium and reduce the quality of water due to sodium leakage from the mixed bed. This is accomplished by the incorporation of small amounts of highly polar functional groups in the polymer. The derived surface hydrophilicity improves the ability of water to wet the resin and prevents it from floating in the resin bed. Conductivity tests were performed with the dyed inert of the present invention and no reduction in resistivity was observed indicating that the inert did not contribute ionized impurities to the water.

The inert material may comprise any suitable inert crosslinked polymer which can be permanently dyed and which meets the above criteria. Typical polymers include crosslinked acrylics and methacrylics, for example amides, esters, and nitriles. In addition, crosslinked polymers of styrene and styrene derivatives may also be used.

Any oil soluble dye which meets the above criteria is suitable for use in the present invention. A suitable dye comprises Oil Soluble Blue A available from Dupont. Chemically it is 1,4-diisopropylamine anthraquinone. The color index is 61551 and the $LD_{50}$ is greater than 17,000 mg/kg.

The following example illustrates a specific embodiment of the present invention, but is not intended to limit the scope of this invention.

EXAMPLE

Approximately 7002 grams of water was placed into an 18-liter glass laboratory reactor equipped with a double-turbine type agitator. To this there was added, in order, with stirring, and with a short intermission between additions to allow for dissolution of dispersion, 7.02 grams of disodium hydrogen phosphate, 17.46 grams of hydroxypropyl methyl cellulose, and 17.46 grams of polyvinyl pyrrolidone. The reactor and its contents were then heated to raise the temperature of the contents to 60° C. during which time agitation was continued to complete the dissolution of the various materials previously added. In a separate second vessel a monomer mixture was prepared by placing 3438 grams of methyl methacrylate, 225 grams of dimethylaminoethyl methacrylate, 837 grams of a commercial 56.6% solution of divinyl benzene, 27.0 grams of azo bis-isobutyronitrile, and 0.9 grams of Oil Soluble Blue A dye available from Dupont therein. Agitation was employed to insure complete dissolution of all of the components. Agitation in the 18-liter reactor was continued as the contents of the second vessel were added to the reactor. The agitation was adjusted to such a rate as to cause the monomer mixture to disperse through the water solution in the form of small droplets. The temperature of the combined reactor contents was adjusted to 60° C. and maintained between 59° C. and 62° C. for a period of four hours. Following this the temperature of the reactor contents was increased to 65° C. and maintained at this temperature for a period of ½ hour; and then, over a period of 1¼ hours the temperature was increased to 80° C. and held there for ¼ hour. Following this the reactor and its contents was cooled to room temperature. On filtration 4220 grams of clear blue solid polymer beads were recovered which were suitable for use as a bed separator. The dyed polymer is then screened to select for the proper size distribution.

The inert resin beads formed by the method set forth in the example exhibit the following typical characteristics as set forth in the table below:

TABLE

| | |
|---|---|
| Polymer Structure | Crosslinked inert polymer |
| Form (physical) | Blue spherical beads (dry) |
| Functional group | None |
| Water retention (after hydration) | 7-9% |
| Maximum temperature | 212° F. (100° C.) |
| Screen size, U.S. Std. (nominal) | 16-30 mesh (wet) |
| Operating pH range | 0-14 |
| Solubility | Insoluble in all common solvents |
| Specific gravity | 1.15 |
| Approximate shipping weight (dry) | 43 lbs./cu.ft. |

The inert material may be used with any suitable anion and cation exchange resins. Two suitable resins include an anion exchange resin sold by Sybron Corporation under the tradename Ionac A-293/BZ and a cation exchange resin sold under the tradename Ionac CFP-110/BZ. The specific characteristics of those resins are tabulated below along with the recommended operating conditions.

| | IONAC A-293/BZ | IONAC CFP-110/BZ |
|---|---|---|
| Screen size, U.S. Std. (nominal) | 20-40 mesh (wet) | 16-30 mesh (wet) |
| Specific gravity | 1.09 (Cl form) | 1.30 (Na form) |
| | 1.07 (OH form) | 1.24 (H form) |
| RECOMMENDED OPERATING CONDITIONS | | |
| Resin volume ratio (cation:anion) | between 0.5:1 and 2:1 | |
| Inert polymer bed depth (% of bed) | 15% | |
| Service flow rate: | | |
| Normal Service | 5-10 gpm/sq.ft. | |
| Condensate Polishing | 15-30 gpm/sq.ft. | |

Other modifications and ramifications of the present invention would appear to those skilled in the art upon a reading of this disclosure. These are intended to be included within the scope of this invention.

We claim:

1. A mixed bed ion exchange system which comprises two layers of anion and cation exchange resins, respectively, an inert layer of polymeric material in bead form separating said ion exchange layers, said inert layer being dyed a highly visible, bright color and which exhibits the following typical characteristics:

Polymer Structure: Crosslinked inert polymer
Form (physical): spherical beads
Functional group: None
Water retention (after hydration): 7-9%
Maximum temperature: 212° F. (100° C.)

Screen size, U.S. Std. (nominal): 16-30 mesh (wet)
Operating pH range: 0-14
Solubility: Insoluble in all common solvents
Specific gravity: 1.15
Approximate shipping weight (dry): 43 lbs./cu. ft.

2. The system of claim 1 in which the inert layer comprises a crosslinked methacrylic polymer.

3. The system of claim 1 in which the inert layer is dyed a bright blue color.

4. The system of claim 1 in which the dyed inert crosslinked polymer comprises one material selected from the group consisting of acrylics, methacrylics, styrene and styrene derivatives.

* * * * *